United States Patent [19]

Gaydos

[11] Patent Number: 5,586,591
[45] Date of Patent: Dec. 24, 1996

[54] ROUTER ACCESSORY FOR PRODUCING CUTS HAVING A CONTOURED DEPTH

[76] Inventor: George G. Gaydos, 509 Peebles Apt #3, Pittsburgh, Pa. 15221

[21] Appl. No.: 339,798

[22] Filed: Nov. 15, 1994

[51] Int. Cl.$^6$ .................. B27C 5/10; B27M 3/00
[52] U.S. Cl. .............. 144/145.2; 144/143; 144/372; 409/165; 409/226; 409/229
[58] Field of Search .................. 409/145, 163, 409/165, 199, 226, 229; 144/134.1, 135.2, 143, 145.2, 145.2, 371, 372

[56] References Cited

U.S. PATENT DOCUMENTS

| | | | |
|---|---|---|---|
| 3,442,309 | 5/1969 | Jentsch | 144/144 R |
| 3,463,049 | 8/1969 | Thomson | 409/226 |
| 4,299,263 | 11/1981 | Skinner | 144/144.5 |
| 4,787,127 | 11/1988 | Beall | 409/229 |
| 5,020,578 | 6/1991 | Jennings | 144/143 |
| 5,271,441 | 12/1993 | Gakhar et al. | 144/134 A |

Primary Examiner—W. Donald Bray
Attorney, Agent, or Firm—Patrick Garrett

[57] ABSTRACT

A router accessory having a housing with a router attaching portion for adjustable attachment to a router. The router accessory also comprises a plate for fixedly holding a work piece. The work piece support plate has a plurality of arms extending therefrom. There is also a plurality of track mechanisms attached to the housing. The arms are slidably attached to tile track mechanisms so that the plate with attached work piece can be guided in a desired path relative to the router bit. The track mechanisms can be constructed to guide the plate in only the x and y directions or in a preferred embodiment tile track mechanisms can have a varying height in the z direction for actively varying the spacing between the router and the work piece as the plate is slidably guided by the track mechanisms during routing. In this manner, cuts can be made in the work piece which have a contoured depth. It should be appreciated that this capability of producing contoured depth cuts has not been offered or taught by any type of router accessory in the prior art.

9 Claims, 4 Drawing Sheets

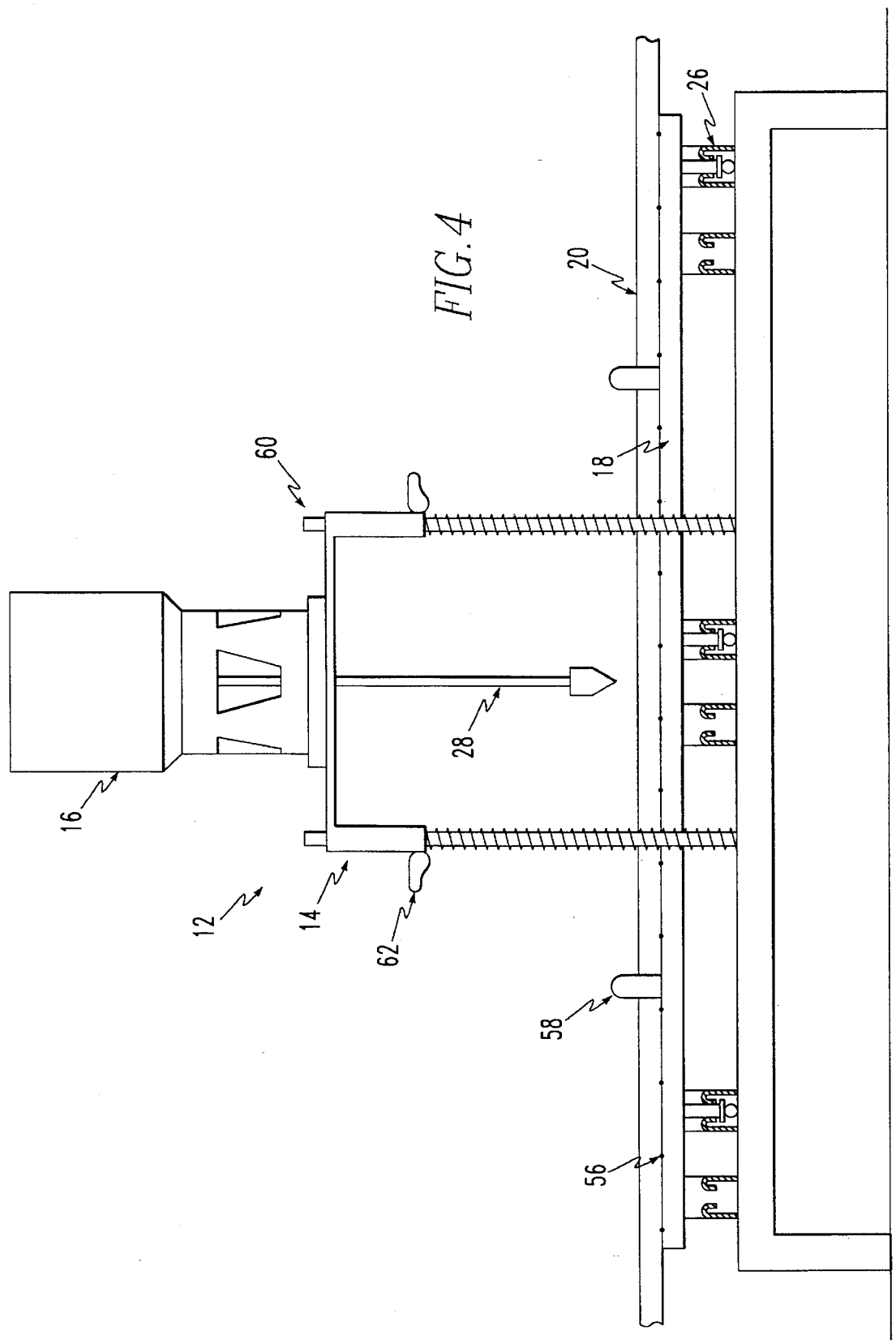

5,586,591

ROUTER ACCESSORY FOR PRODUCING CUTS HAVING A CONTOURED DEPTH

FIELD OF THE INVENTION

The present invention is related in general to woodworking tools. More specifically the present invention is related to a router accessory to be used in conjunction with a router for producing cuts having a contoured depth.

BACKGROUND OF THE INVENTION

Conventional routers are traditionally electric powered hand tools which can be used to cut patterns in wooden work pieces. Various types of cuts can be made depending on the type of router bit used. There are a great number router bits available each of which cuts a specific cross section. U.S. Pat. No. 3,543,820 to Tulumello shows a router bit for cutting rosette cuts. Various types of router guidance accessories have been developed to guide the router in a preferred path on the work place. For instance. U.S. Pat. No. 5,271,441 to Gakhar et al., discloses a device for guiding the work place in circular paths so that concentric circular cuts can be made around a common center for producing annular geometry rosettes. It should be specifically noted that with the Gakhar et al. patent the depth of the cut is set before cutting and remains fixed during cutting.

The present invention discloses a router accessory which has novel track mechanisms allowing the depth of the cut to be varied actively during the cutting process. In this manner the cut can be guided in all three dimensions.

SUMMARY OF THE INVENTION

The present invention is a router accessory. The router accessory comprises a housing having a router attaching portion for adjustable attachment to a router. The router accessory also comprises a plate for fixedly holding a work piece. The work piece support plate has a plurality of arms extending therefrom. There is also a plurality of track mechanisms attached to the housing. The arms are slidably attached to the track mechanisms so that the plate with attached work piece can be guided in a desired path relative to the router bit. The track mechanisms can be constructed to guide the plate in only the x and y directions or in a preferred embodiment the track mechanisms can have a varying height in the z direction for actively varying the spacing between the router and the work place as the plate is slidably guided by the track mechanisms during routing. In this manner cuts can be made in the work piece which have a contoured depth. It should be appreciated that this capability of producing contoured depth cuts has not been offered or taught by any type of router accessory in the prior art.

In one embodiment the track mechanisms are preferably releasably attached to a track support which is itself adjustably attached to the housing. For instance, the track support can be rotatably attached to the housing for allowing the track support to be turned in angular increments in order to produce spaced angular cuts emanating from the center of the work piece.

The track mechanisms can be constructed in any convenient manner to guide the arms of the plate along the desired undulating path. Each track mechanism can comprise a pair of track elements enclosing a space and a plurality of bearings held within the space for slidably supporting the arms of the plate. Preferably each arm comprises a T-shaped end portion which rides on the bearings in the space between the track elements.

In another embodiment the router accessory can be adapted for cutting contoured depth profile cuts at predetermined points along a given length of an elongated work place such as for example piece of molding.

BRIEF DESCRIPTION OF THE DRAWINGS

FIG. 4 is a schematic representation showing a front view of another embodiment of the router accessory.

DESCRIPTION OF THE PREFERRED EMBODIMENT

Figure 1:
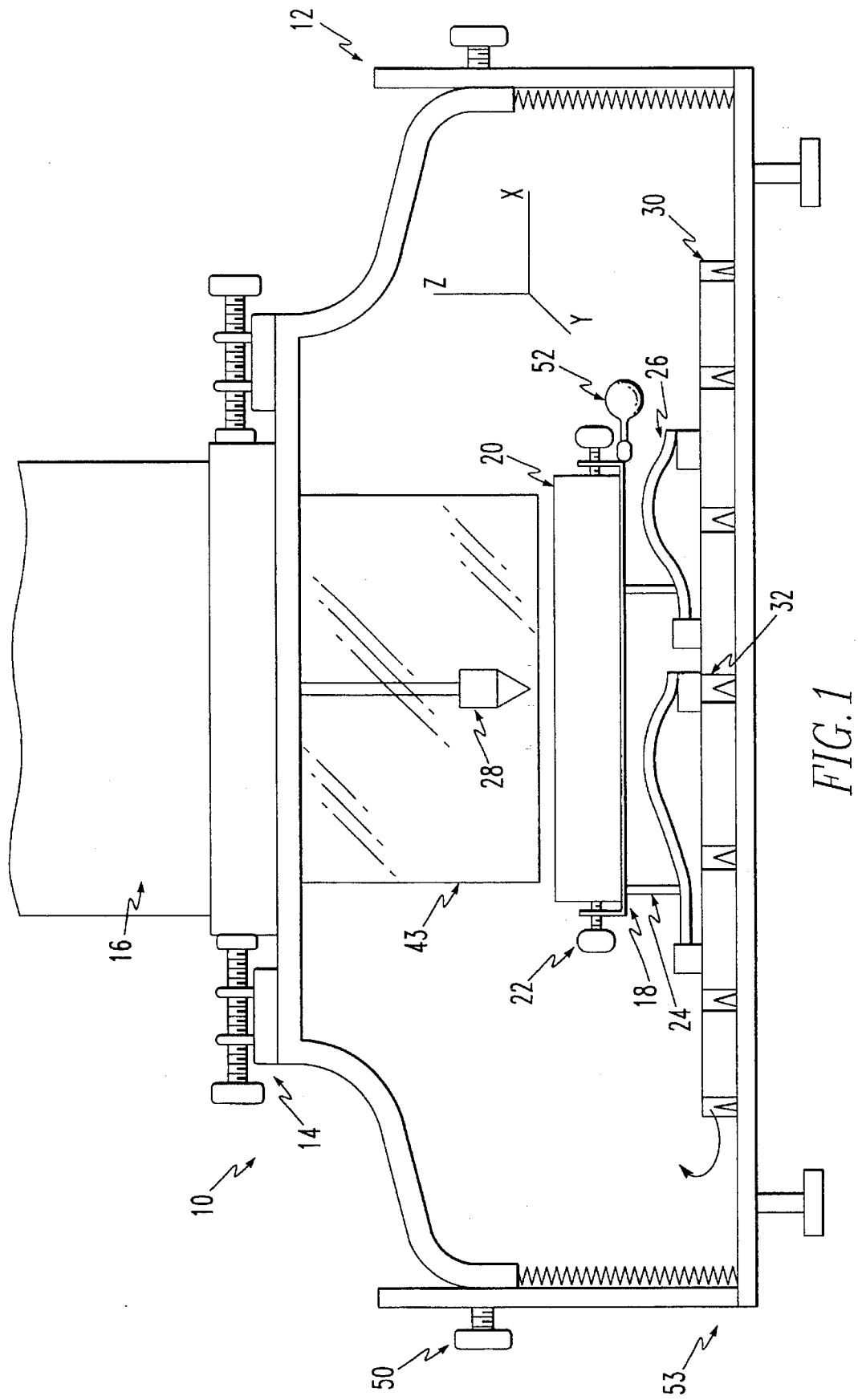
FIG. 1 is a schematic representation showing one embodiment of the router accessory.

Referring now to the drawings wherein like reference numerals refer to similar or identical parts throughout the several views and more specifically to FIG. 1 thereof there is shown a router accessory 10. The router accessory 10 comprises a housing 12 having a router attaching portion 14 for adjustable attachment to a router 16. The router accessory also comprises a plate 18 for fixedly holding a work piece 20, such as with adjustable thumb screw mechanisms 22 for example. The work piece support plate 18 has a plurality of arms 24 extending therefrom. There is also a plurality of track mechanisms 26 attached to the housing 12. The arms 24 are slidably attached to the track mechanisms 26 so that the plate 18 with attached work piece 20 can be guided in a desired path relative to the router bit 28. The track mechanisms 26 can be constructed to guide the plate 18 in only the x and y directions or in a preferred embodiment the track mechanisms 26 can have a varying height in the z direction for actively varying the spacing between the router 16 and the work place 20 as the plate 18 is slidably guided by the track mechanisms 26 during routing. In this manner, cuts can be made in the work piece 20 which have a contoured depth. It should be appreciated that this capability of producing contoured depth cuts has not been offered or taught by any type of router accessory in the prior art.

In one embodiment the track mechanisms are preferably releasably attached to a track support 30 which is itself adjustably attached to the housing 12. For instance, the track support 30 can be rotatably attached to the housing 12 for allowing the track support to be turned in angular increments in order to produce spaced angular cuts emanating from the center of the work piece 20. Such a pattern is well known with ornamental rosettes. Preferably the track support 30 has a plurality of angularly spaced guide lines 32 for accurate angular determination. As illustrated in FIG. 1, the housing 12 can comprise a clear safety shield 43 which encloses the router bit 28.

Figure 2:
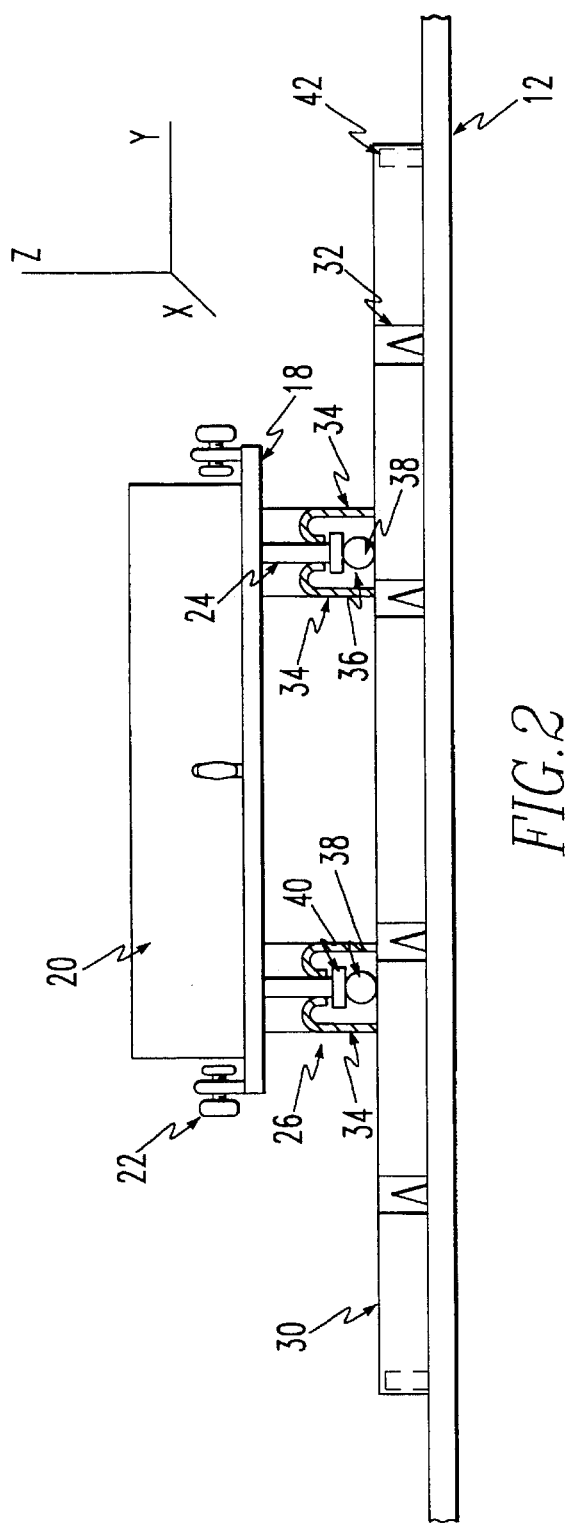
FIG. 2 is a schematic representation showing the plate and track mechanism in closer detail.
Figure 3:
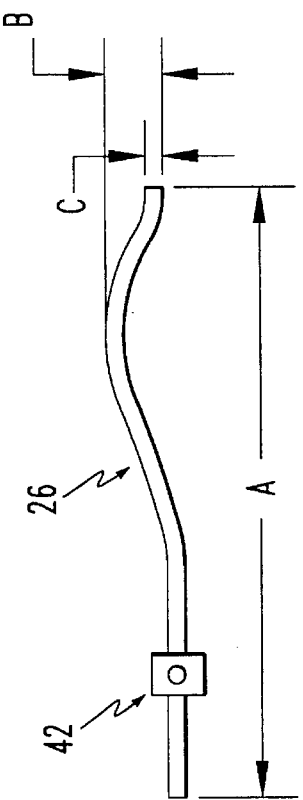
FIG. 3 is a schematic representation showing a side view of a track mechanism.

The track mechanisms 26 can be constructed in any convenient manner to guide the arms 24 of the plate 18 along the desired undulating path. One embodiment of a track mechanism 26 is illustrated in FIG. 2. In this embodiment each track mechanism 26 comprises a pair of track elements 34 enclosing a space 36 and a plurality of bearing 38 held within the space 36 for slidably supporting the arms 24 of the plate 18. Preferably each arm comprises a T-shaped end portion 40 which rides on the bearings 38 in the space 36 between the track elements 34. If desired each track mechanism 26 can comprise a stop mechanism 42 for limiting the range on which the arms 18 can slide on their respective track mechanism 26. It should be appreciated that one skilled in the art could devise other types of track mechanism construction without departing from the scope and spirit of this invention. FIG. 2 also shows an annular rim 43 on the housing 12 which can be used to engage with and anularly support a circular track support 30. FIG. 3 three illustrates a side view of a track mechanism 26 for cutting rosettes. The dimensions A. B and C are 3 ½ and ⅛ inches respectively.

Figure 5A:
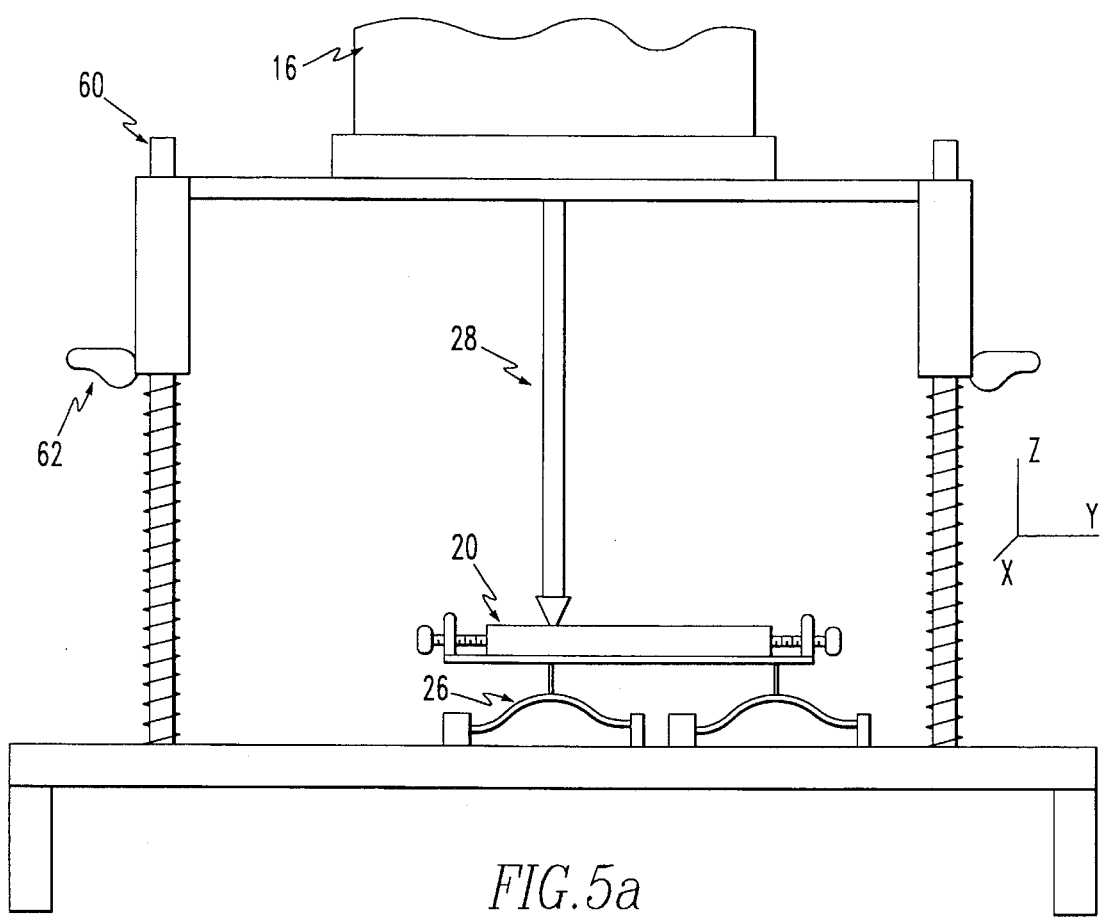
FIG. 5a is a schematic representation showing a side view of the router accessory embodiment shown n FIG. 4.

A somewhat different embodiment of the invention is shown in FIG. 4. In this embodiment, the router accessory 10 is adapted for cutting contoured depth profile cuts at predetermined points along a given length of an elongated work place, such as for example piece of molding. Linear roller bearings 56 can be used to facilitate slidable movement of the wood 20 on the plate 18. Adjustable tension spring and thumb latch 58 can be used to hold the wood 20 down and out of the way of the router bit 28 so as to move the wood 20 to the next position. If desired, the track mechanisms 26 can be attached directly on the housing 12 since, with this embodiment, no rotation of the track mechanisms is necessary and thus no track support in needed. A preferable length of the plate 18 is around 4 feet but is not limited thereto. It should be noted that FIGS. 4 and 5 illustrate a different construction of the housing 12. The router attachment portion 14 is slidably engaged with four upstanding poles 60. Thumb latches 62 can be used to adjustably control the height of the router 16 relative to the work place 20. Springs 64 about the poles 60 can be used to bias the router attachment portion 14 away from the work place 20. FIG. 5 illustrates a side view of the router accessory 10 of FIG. 4.

It should appreciated that the router accessory 10 can also be constructed to be used with a standard routing table with the router bit extending upwards. In such an embodiment the work place would be slidably guided from above rather than below. Attention is directed to U.S. Pat. No. 5,271,441 to Gakhar et al. incorporated by reference herein, which disclose in a housing construction which is attached to a router table below.

In the operation of the router accessory 10 it is assumed that a wooden rosette having angular spaced center radiating cuts is to be produced. With reference to FIG. 1, a wood rosette 20 is placed on the plate 18 and secured with adjustable thread screw mechanisms 22. The router height is set with thumb screws 50 which bear against a lower portion 53 of the housing 12. The track support 30 is rotated to a desired position. With the router 16 turned on, the plate 18 is then guided with handle 52 move the rosette 20 onto the router bit 28. The track mechanisms 25 guide the plate 18 in the appropriate undulating path to cause the router bit 28 to cut the desired contoured depth cut into the rosette 20. After the cut is finished the track support 30 is rotated to the next desired angular position in position for the next cut. This process continues until all the desired cuts are done. It should be appreciated that a variety different shaped track mechanism can be installed on the support plate to produce a multitude of rosette patterns.

Figure 5B:
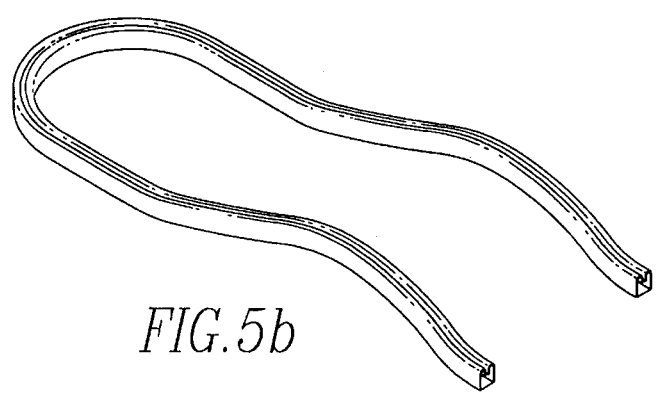
FIG. 5b is a schematic representation showing a perspective view of an undulating U-shaped track mechanism.

In the embodiment shown in FIGS. 4 and 5 the cutting process is similar however the work piece 20 is moved periodically along its length to produce a linear repeating geometric pattern. FIG. 5b shows an example of a track mechanism 26 for producing an undulating U-shaped cut having a varying depth. Although the invention has been described in detail in the foregoing embodiments tier the purpose of illustration, it is to be understood that such detail is solely for that purpose and that variations can be made therein by those skilled in the art without departing from the spirit and scope of the invention except as it may be described in the following claims.

What is claimed:

1. A router accessory comprising:

a housing having a router attaching portion;

a plate for fixedly holding a work piece, said plate having a plurality of arms extending therefrom; and a plurality of track mechanisms attached to said housing, said arms slidably attached to the track mechanism so that the plate can be guided in a desired path relative to the router, said track mechanisms having varying height for actively varying the spacing between the router attached to the housing and the plate as the plate is slidably guided by the track mechanisms.

2. A router assembly as described in claim 1 wherein the track mechanisms are fixedly attached to track support, said track support adjustably attached to the housing.

3. A router assembly as described in claim 2 wherein said track support is rotatably attached to the housing.

4. A router assembly as described in claim 2 wherein each track mechanism comprises a pair of track elements enclosing a space and a plurality of bearings held within said space for slidably supporting the arms of the plate.

5. A router assembly as described in claim 4 each arm comprises a T-shaped end portion which rides on the bearings in the space between the track elements.

6. A router assembly as described in claim 5 wherein each track mechanism comprises a stop mechanism for limiting the range on which the arms can slide on their respective track mechanism.

7. A router assembly as described in claim 6 wherein the plate comprises a plurality of linear bearing for allowing the work place to slide thereon.

8. A router assembly as described in claim 7 wherein the plate comprises a plurality of thumb latches for holding a work place on the plate.

9. A router assembly as described in claim 7 wherein the plate comprises a plurality of adjustable threaded screw mechanisms for releasably holding a work place on the plate.

* * * * *